(12) United States Patent
Funakoshi

(10) Patent No.: US 6,921,571 B2
(45) Date of Patent: Jul. 26, 2005

(54) THERMOPLASTIC RESIN FOAM MOLDING

(75) Inventor: Satoru Funakoshi, Kameoka (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/056,211

(22) Filed: Jan. 28, 2002

(65) Prior Publication Data
US 2002/0136861 A1 Sep. 26, 2002

(30) Foreign Application Priority Data
Jan. 30, 2001 (JP) .......... 2001-021381
Jan. 30, 2001 (JP) .......... 2001-021382

(51) Int. Cl.$^7$ .......... B32B 3/26; B32B 5/20; B32B 3/00; B60J 5/00; E04C 2/38
(52) U.S. Cl. .......... 428/156; 428/158; 428/159; 428/71; 428/76; 428/119; 428/120; 428/318.8; 428/318.6; 428/31; 52/716.5; 296/1.08; 296/146.7
(58) Field of Search .......... 428/156, 158, 428/71, 131, 76, 31, 159, 318.8, 318.6, 119, 120; 296/146.7, 1.08; 52/716.5

(56) References Cited
U.S. PATENT DOCUMENTS 4,446,185 A * 5/1984 Waragai et al. .......... 428/67
4,572,856 A * 2/1986 Gembinski .......... 428/71
4,892,770 A * 1/1990 Labrie .......... 428/71
5,037,687 A * 8/1991 Kargarzadeh et al. .......... 428/71
2001/0041245 A1 11/2001 Funakoshi .......... 428/131

FOREIGN PATENT DOCUMENTS

| EP | 0 481 306 A1 | 4/1992 |
| EP | 0 925 895 A1 | 6/1999 |
| JP | B H07-77739 | 8/1995 |
| JP | A 11-179752 | 7/1999 |
| JP | A 2001-322433 | 11/2001 |

* cited by examiner

Primary Examiner—Harold Pyon
Assistant Examiner—Catherine A. Simone
(74) Attorney, Agent, or Firm—Kendrew H. Colton; Fitch Even Tabin & Flannery

(57) ABSTRACT

The present invention intends to provide a thermoplastic resin foam molding comprising a substrate having a foam layer and a projection formed in one piece together with the substrate wherein the projection hardly separates from the substrate and they are firmly jointed together. The invention provides a thermoplastic resin foam molding comprising a substrate and a projection formed in one piece together with the substrate wherein the substrate has a foam layer and a skin layer containing no voids wherein the ratio (R/L) of the curvature R of a joint between the projection and the substrate to the thickness L of the skin layer is from 3 to 50.

8 Claims, 20 Drawing Sheets

THERMOPLASTIC RESIN FOAM MOLDING

FIELD OF THE INVENTION

The present invention relates to thermoplastic resin foam moldings.

BACKGROUND OF THE INVENTION

There are strong demands for heat insulation property and reduction of weight in the fields of interior parts of automobiles or the like such as various types of trims including door trims and side trims and various types of pillars, instrument panels as well as parts of household electrical appliances and building materials. As an approach for achieving such demands, JP-A-11-179752, for example, discloses automotive interior parts comprising olefin resin foam moldings comprising a skin layer and a foam layer.

Such a foam molding has a structure where a foam substrate comprising a foam layer having thereon a minute skin layer containing no voids is formed in one piece together with a projection such as a rib, a boss and a bracket through which the foam substrate is attached to a vehicle body or another member.

However, when a projection such as a rib, a boss and a bracket is attached to a foam substrate, a skin layer of the foam substrate and a circumferential face of the projection along the height direction of the projection defines a corner having a right angle or corresponding to the attaching angle at a joint between the projection and the foam substrate, so that there is a problem that when external force is applied, stress is concentrated to the corner and, therefore, the projection is easily broken. Hence, the present inventor studied to develop a thermoplastic resin foam molding comprising a substrate having a foam layer and a projection formed in one piece together with the substrate wherein the projection hardly separates from the substrate and is firmly jointed to the substrate. As a result, the present inventor has reached the present invention.

SUMMARY OF THE INVENTION

The present invention provides a thermoplastic resin foam molding comprising a substrate and a projection formed in one piece together with the substrate wherein the substrate has a foam layer and a skin layer containing no voids wherein the ratio (R/L) of the curvature R of a joint between the projection and the substrate to the thickness L of the skin layer is from 3 to 50.

Figure 1:
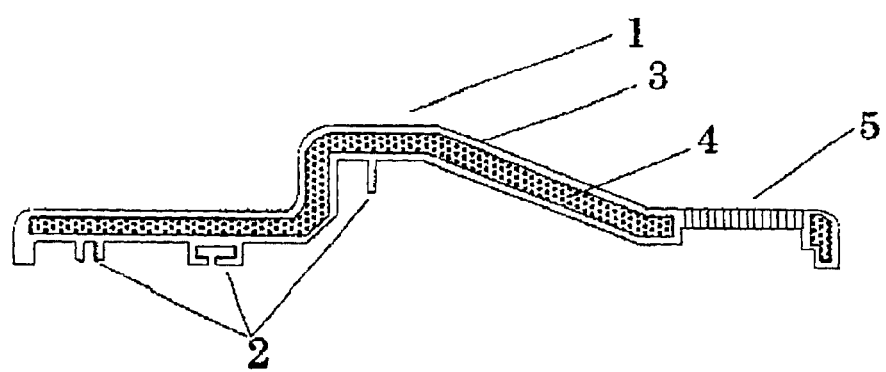
FIG. 1 is a schematic sectional view of a molding according to the present invention.

Description of Reference Numerals:

1: Substrate
2: Projection
3: Skin layer
4: Foam layer
5: Opening hole
6: Joint
7: Male mold
8: Female mold
9: Molten thermoplastic resin
10: Resin supply passage
11: Resin supply device 12: Resin supply port
13: Skin material
14: Boundary of a joint between a substrate and a projection
15: Skin material junction layer
16: Surface of a molding
17: Cell
18: Slide core
19: Cylinder

DETAILED DESCRIPTION OF THE INVENTION

The present invention is described below.

A thermoplastic resin foam molding of the present invention has a structure in which, as FIG. 1 shows a cross section of the molding, a foam substrate (1) having a foam layer is provided with a projection in the form of a bracket, a rib or a boss united with the substrate (hereinafter, this may only be called a projection).

The projection (2) may be formed together with the substrate from the same material as that of the substrate and also may be a projection previously molded or produced as a separate member and attached to the substrate by welding or the like. However, it is preferable that the projection (2) is formed in one piece together with the substrate from the same material as that of the substrate.

The substrate (1) has a foam layer (4) inside, and a skin layer (3) having no or almost no voids is formed to form a surface of the substrate generally in most part of the main body of the substrate.

A skin layer formed to form the surface in the designed side of the substrate may be applied with various shank or crimp patterns. The skin layer may also, if needed, have a skin material laminated thereon such as a sheet or film made of thermoplastic resin, or a woven fabric, a nonwoven fabric or a knitted fabric.

Although the projection is usually formed in the non-designed side of a substrate, the non-designed side may, if needed, also have thereon a skin material or backing material laminated such as a sheet or film made of thermoplastic resin, or a woven fabric, a nonwoven fabric, a knitted fabric or the like. In this case, the skin material or backing material is generally laminated on a region except the projection joined. However, in some cases, the skin material or backing material may be laminated on the foam substrate so as to wrap the projection and all.

A part of the substrate may optionally be provided with a speaker grille or an opening hole (5) for installing therein various kinds of switch panels, and the composition of the substrate is optional.

A foam layer must be contained inside such a substrate. For the achievement of a sufficient light weight, the density ρ of the foam layer is preferably 0.7 g/cm³ or less, and more preferably 0.6 g/cm³ or less. The lower limit of the density has no particular limitation, but it is approximately 0.2 g/cm³ in consideration of reduction of strength of the foam layer.

Figure 2:
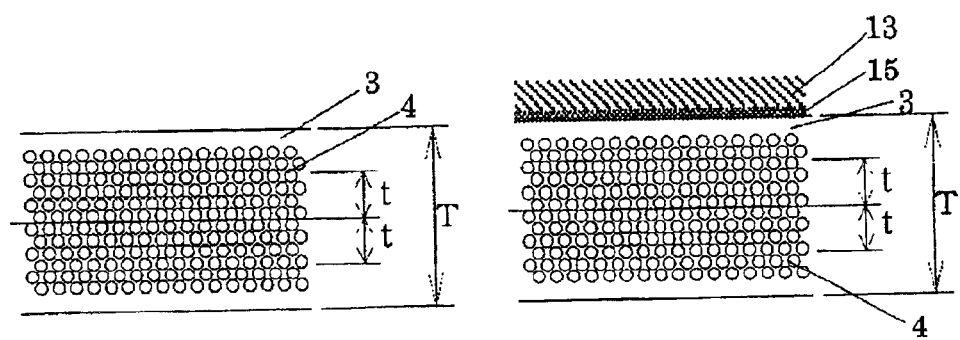
FIG. 2 is a schematic sectional view for illustrating measurement of the density of a substrate in a molding of the present invention.

As shown in FIG. 2 wherein the thickness of the foam molding containing a skin layer (3) is T, the density of a foam layer of the substrate (1) referred to above indicates the density of a center layer (2t) obtained by cutting out a region within 30% (t=0.3T) of the thickness of the foam molding from approximately the center thereof in the thickness direction toward both surfaces of the foam molding.

It is to be noted that when a skin material (13) is laminated on a surface of a substrate, the thickness of a portion of a foam molding except a skin material (13) and a skin material junction layer (15) such as an adhesive layer is defined as the thickness T of the foam molding.

A substrate (1) need not be flat, and it may have a curved surface, a convex portion or a concave portion so as to have a desired configuration depending on its applications.

The thickness of a substrate (1) is determined suitably depending on applications, but it is usually approximately from 2 to 10 mm, and preferably approximately from 2.5 to 8 mm since if a substrate is too thin, it is poor in strength.

The weight of a substrate per unit area varies depending on the type of a thermoplastic resin used, the thickness of the foam substrate and so on, but the lighter the substrate, the more desirable it is unless physical properties such as strength are particularly affected. The weight of a substrate is usually 2200 g/m² or less, and preferably 1800 g/m² or less.

Figure 3:
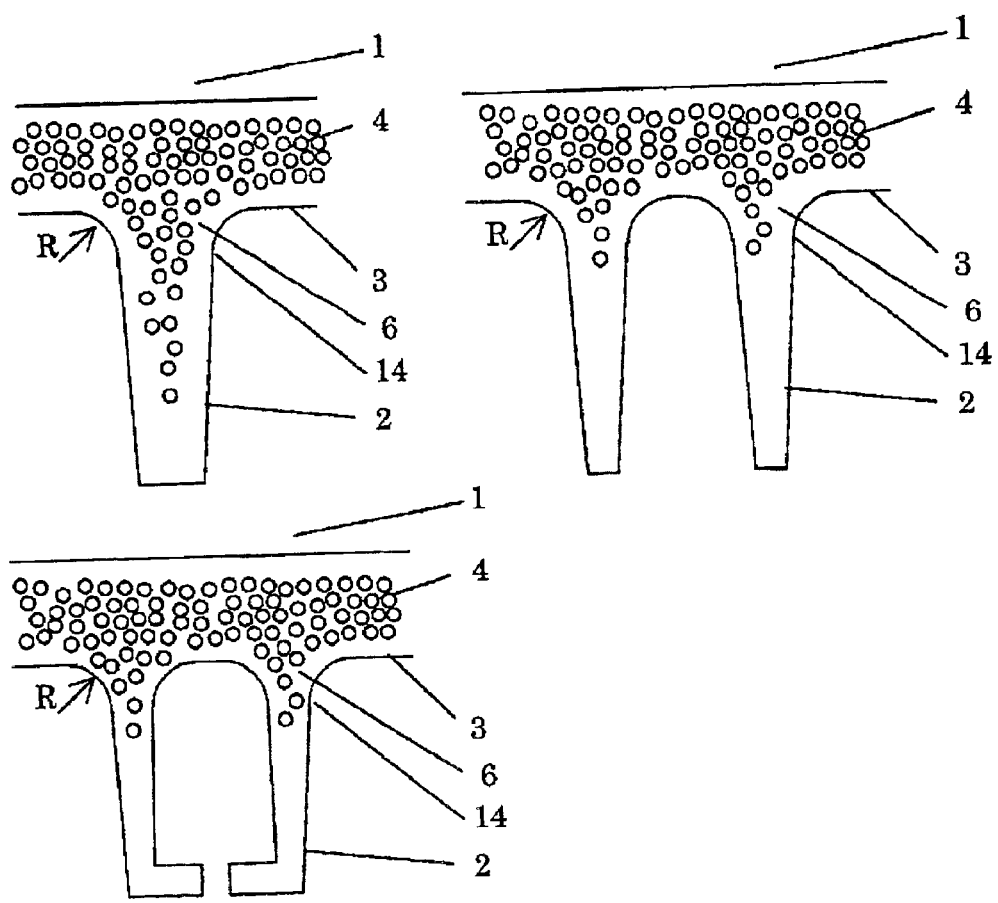
FIG. 3 contains schematic sectional views each illustrating a joint between a projection and a substrate in a molding of the present invention. The views show the difference in shape or attaching mode of the projection.

In the present invention, a projection (2) formed in one piece together with a substrate (1) means a projecting member such as a rib-like member, a boss-like member, a pin-like member and a clip seat provided for the purpose of fixing or mounting the substrate to an automotive body (a structure member) or other parts as shown in FIG. 3. The thickness of such a projection is determined suitably depending on applications of the projection, and it is approximately from 1 to 5 mm for clip seats, approximately from 1 to 3 mm for rib-like projections to which a weather strip is fixed, and approximately from 5 to 10 mm in outer diameter and approximately from 2 to 8 mm in inner diameter for boss-like projections into which a small screw or the like is screwed.

In the present invention, a projection (2) and a substrate (1) are jointed so that a surface skin layer of the substrate and a circumferential surface of the projection in its height direction form a curved surface in the joint. It is desirable that they are jointed so that the ratio (R/L) of the curvature R of the joint to the thickness L of the skin layer in the foam substrate is from 3 to 50.

Figure 4:
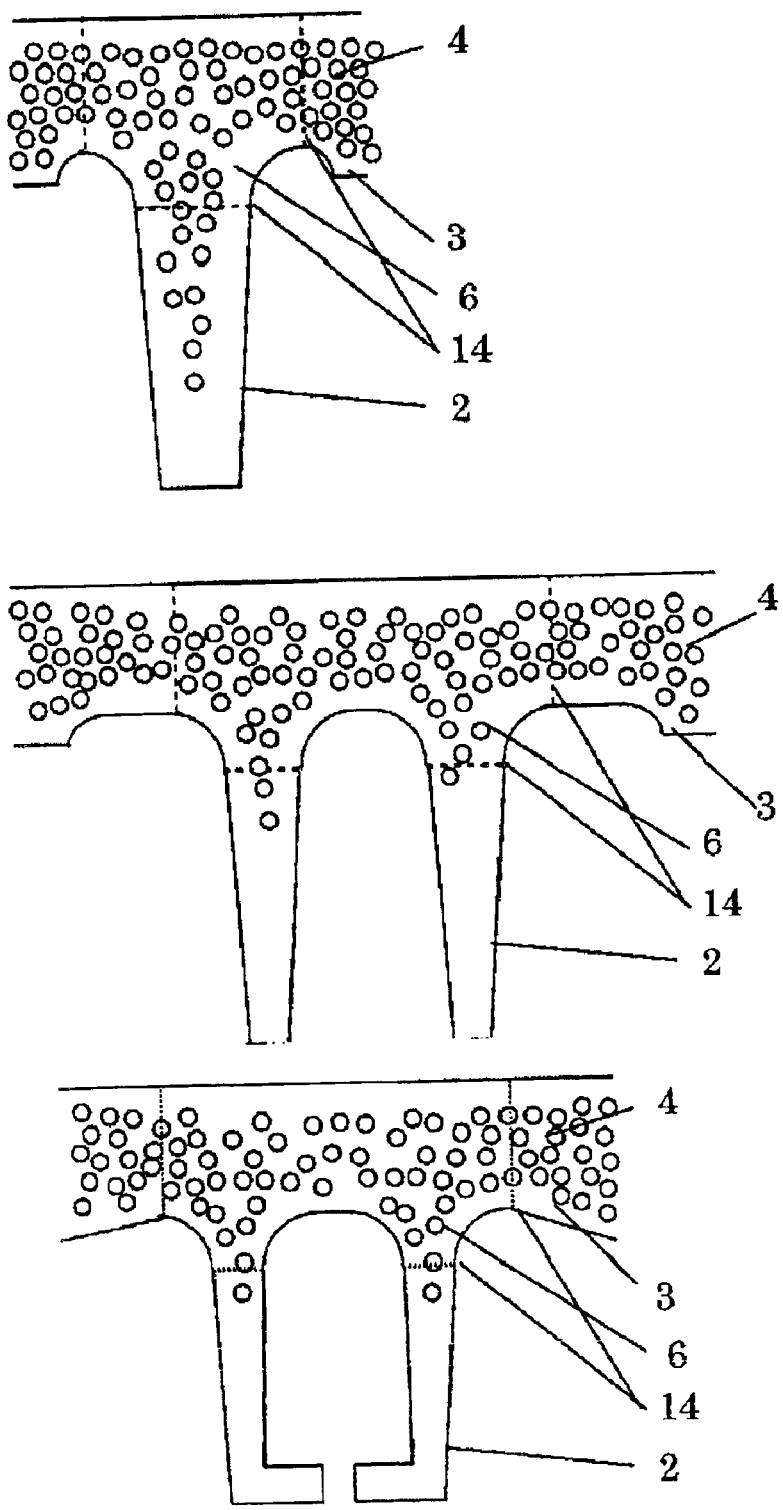
FIG. 4 contains schematic sectional views illustrating a joint between a substrate and a bracket in a molding that is a preferred embodiment of the present invention. The views show the difference in shape or attaching mode of the bracket.

As shown in FIG. 4, the joint (6) referred to herein indicates an area within a boundary (14) where the curvature portion of the foam substrate (1) and of the projection (2) ends in the part of their joint. The curvature R is a value defined by the outermost surfaces of the substrate and the projection.

The projection (2) and the substrate (1) are jointed through a joint (6) having a certain curvature. The ratio (R/L) of the curvature R to the thickness L of a skin layer of the foam substrate, which the skin layer is on the side where the projection is jointed, is within the range of from 3 to 50, preferably from 10 to 30.

If the ratio is too small, a large stress is concentrated to the joint when external force is applied, resulting in easy breakage and easy detachment of the projection. If the ratio is too large, defective appearance such as a sink mark is formed in a surface of the foam substrate opposite to the projection.

The thickness L of a skin layer of a foam substrate, which the skin layer is on the side where a projection is jointed, is defined as an average value of the thicknesses of the skin layer measured in cross sections taken in the thickness direction at at least three optional positions near the projection except the joint (6).

Figure 5:
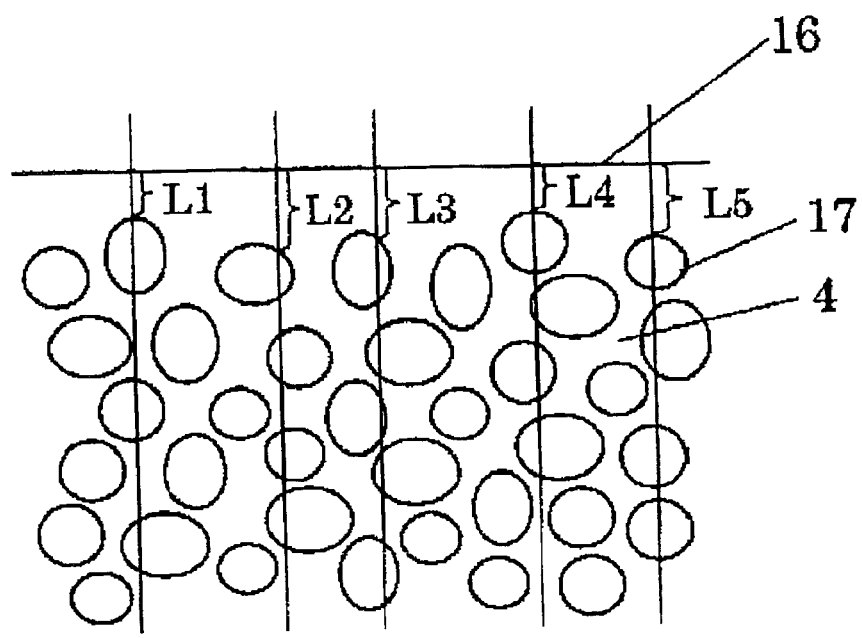
FIG. 5 shows a method for measuring the thickness of a skin layer of a foam substrate in a molding of the present invention using a schematic sectional view.

Concretely, cut a foam molding along its thickness direction at at least three optional positions near a projection except a joint (6), take a scanning electron microphotograph for each cross section, then draw lines perpendicularly from a surface (16) of the foam molding in the photograph toward the core of a foam layer (4) at optional five positions as illustrated in FIG. 5, and measure the length on each line from the surface (16) of the molding to a first cell (17), and repeat this operation for every cross section. The average of the measurements obtained in the cross sections at at least fifteen positions in total is defined as the thickness of the skin layer L.

In the present invention, the thickness of a skin layer near a projection is not particularly limited and can be determined depending on the shape of a molding and materials used. However, it is desirable to set the thickness to approximately from 0.1 to 1 mm.

Such a projection (2) is jointed to a substrate (1) to be united with the substrate (2).

From the viewpoint of a joint power between a substrate and a projection, the projection jointed to the substrate preferably is non-foamed or has an foamed ratio of 1.3 times or less. If the foamed ratio becomes greater than 1.3 times, a projection may become easy to be broken by concentrated stress and the like.

The foamed ratio of a joint indicates the foamed ratio within the region of the projection and the substrate surrounded by the aforementioned boundary (14) as illustrated in FIG. 4 (a region surrounded by three dotted lines as illustrated in FIG. 4).

In the case where a projection (2) is foamed, the foam portion may extend throughout the projection. Alternatively, the projection may be foamed partly, for example, only in its central portion or in its root portion.

The foamed ratio indicates an average foamed ratio of the whole of the projection. When a projection has a non-foam portion as well as a foam portion, the foamed ratio indicates an average foamed ratio combining the non-foam portion and the foam portion.

The foamed ratio of the projection (2) referred to herein can be expressed by the ratio of the specific gravity of the non-foam portion of the projection to the specific gravity of the whole of the projection (the specific gravity of the non-foam portion/the specific gravity of the whole of the projection).

If a projection has no non-foam portion therein, a part of the projection may be temporarily molten at a temperature suitable for the material thereof and then be formed into a non-foam molding by cooling press or the like. The specific gravity of the resulting non-foam molding may be taken as the specific gravity of the non-foam portion. The pressure applied during the press is within the range of from 0.1 to 5 MPa.

The gravities are measured by known techniques such as the general immersion method.

In thermoplastic resin foam moldings of the present invention, if the foamed ratio of a joint (6) between a substrate (1) and a projection (2) is increased, the joint strength at that portion is reduced and the projection becomes easy to be broken. Therefore, it is important that the foamed ratio of the joint is within the range of from 1 to 1.3 times.

The foamed ratio of the joint (6) can be measured by the same method as that for the foamed ratio of the aforementioned projection. That is, the inside of a joint region (a joint) is cut out based on the aforementioned boundary and the foamed ratio of the joint can be expressed by the ratio of the specific gravity of the non-foam portion in the region to the specific gravity of the whole of the joint (the specific gravity of the non-foam portion/the specific gravity of the whole of the joint).

When a thermoplastic resin foam molding of the present invention has two or more projections (2) formed on a substrate (1) and also has two or more joints, the determination of what joint is caused to have the aforementioned ratio (R/L) of the dimension of a curvature R to the thickness L of a skin layer of a foam substrate, which the skin layer is on the side where the projection is jointed, can be based on the consideration of conditions of concentration of stress generated when the thermoplastic resin foam molding of the present invention is mounted to another member.

In the case where a projection is formed stretchingly, for example, in the form of a rib-like bracket, it is desirable that the above-mentioned foamed ratio requirement is satisfied continuously or discontinuously for at least 10% of the projection along its longitudinal direction.

Examples of thermoplastic resin used for such foam moldings include thermoplastic resins such as polypropylene, polyethylene, polyethylene terephthalate (PET), acrylonitrile-styrene copolymer (AS resin), acrylonitrile-butadiene-styrene terpolymer (ABS resin), polystyrene (PS resin), polycarbonate (PC resin) and polyamide, polymer alloys made from these thermoplastic resins, and mixtures thereof. The term "thermoplastic resin" used in the present invention encompasses all of those described above.

Such a thermoplastic resin can contain, for example, fillers for reinforcement such as various kinds of fillers and fibers, pigments for coloring, various types of coloring agents for forming inhomogeneous patterns, polyester fibers and an elastomer for imparting flexibility. Moreover, it can contain various types of additives such as antistatic agents, weathering agents and lubricants.

Of such thermoplastic resins, a propylene-based resin alone or a mixture of a propylene-based resin and another thermoplastic resin or elastomer is preferably used due to their excellent formability and light weight. The propylene-based thermoplastic resin may be either a polypropylene homopolymer or a copolymer obtained by copolymerizing propylene as a main component with another olefin component such as ethylene.

When a propylene-based resin is used, it is desirable that various compounding ingredients are added so that the Izod impact value at 23° C. becomes 10 kJ/m$^2$, preferably from 15 to 60 kJ/m$^2$ (JIS K6758, with notch).

In the present invention, preferably used are mixtures comprising a propylene-based resin and an elastomer for imparting flexibility thereto.

Examples of the elastomer to be used for such a purpose include natural rubbers, isoprene rubbers, styrene-butadiene rubbers, butadiene rubbers, nitrile rubbers, olefin rubbers such as ethylene-propylene rubbers, ethylene-butene rubbers and ethylene-octene rubbers, and fluororubbers. Among them, preferred are olefin rubbers having a PEAK value in DSC of approximately from 40 to 100° C. (programming rate: 10° C./min), a Shore A hardness of from 70 to 90 (JIS K6301, 23° C.) and a tensile elongation of 600% or more (JIS K6301, 23° C.) due to their excellent heat resistance.

When such an elastomer is blended, the amount of the elastomer added can be selected suitably depending on the type of a thermoplastic resin used and necessary properties for a desired molding. When an olefin rubber is added to a propylene-based resin, the weight ratio of the propylene-based resin to the olefin rubber is approximately from 7:3 to 9:1.

In the production of a thermoplastic resin foam molding of the present invention, a projection can be attached to a substrate by being formed in one piece together with the substrate from the same material as that of the substrate or by welding or the like of a projection previously produced as a separate member to a substrate. However, it is preferable that a projection is attached to a substrate by being formed in one piece together with the substrate from the same material as that of the substrate.

In the former approach, a method is applied in which a mold comprising a pair of male and female molds is used and in which a molten thermoplastic resin containing a foaming component is supplied and filled into the mold cavity and thereafter a part of or the whole mold cavity of the mold is extended so that the molten thermoplastic resin is foamed.

As a foaming component blended into a thermoplastic resin, conventionally known chemical foaming agents can be used. Alternatively, a gas such as carbon dioxide gas and nitrogen gas or a liquid resulting from the liquefaction of such a gas, as a foaming agent, can be supplied directly into a molten thermoplastic resin under pressure.

When a chemical foaming agent is used, there are no special limitations on the type thereof. However, inorganic foaming agents mainly containing sodium hydrogencarbonate or the like are preferably employed because they hardly corrode molds.

Such a chemical foaming agent may be added and be blended during its melt kneading with a thermoplastic resin. However, in general, a chemical foaming agent is used in the form of a master batch obtained by kneading the foaming agent with a thermoplastic resin so that the content of the foaming agent becomes from 20 to 80% by weight.

A typical method of the production of a thermoplastic resin foam molding of the present invention is described below.

Figure 6:
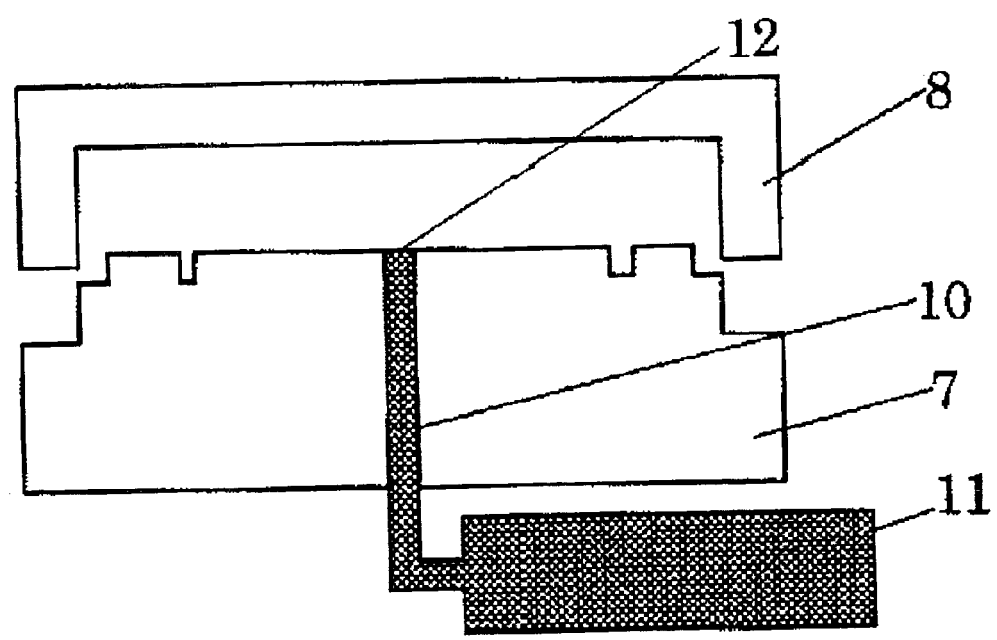
FIG. 6 shows an example of a mold used for a process of the present invention using its a schematic sectional view.

FIG. 6 shows an example of a mold used in such a method using a schematic sectional view thereof. This mold comprises a pair of a male mold (7) and a female mold (8). Generally, one of the molds is mounted to a clamping device such as a press device and another is fixed so that the molds can be opened and closed relatively in a vertical or horizontal direction.

In the figure, the male mold (7) is fixed and the female mold (8) is mounted to a press device (not shown) so that the molds are opened and closed relatively in a vertical direction.

Such a mold has, in a predetermined position, an impression for forming a projection, a slide core for forming a clip seat or the like.

In the figure, an impression is provided in the lower-arranged mold. However, it may be provided in the upper-arranged mold or may be formed in both molds. The position where an impression is formed can be determined suitably depending on the application or usage manner of the desired molding. A joint between a mold face for forming a foam substrate and, for example, an impression for forming a projection is designed so that a molding finally obtained has a predetermined curvature R.

The method for supplying a molten thermoplastic resin (9) into a mold cavity is optional. However, generally preferred is a method wherein a resin supply port (12), which is linked to a resin supply device (11) such as an injection device via a resin supply passage (10) formed in the mold, is arranged in the mold face of one of the molds or in the mold faces of both molds and a molten thermoplastic resin (9) is supplied to the cavity through the resin supply port (12).

In such a preferred case, it is desirable that an optionally controllable opening and closing valve is provided in the resin supply passage (10) near the resin supply port (12) so that the supply and the stop of a molten thermoplastic resin accumulated in the resin supply device (11) can be optionally controlled.

The molten thermoplastic resin (9) can be filled into the mold cavity by injection filling carried out while the molds are closed. Alternatively, the molten thermoplastic resin (9) can be supplied to between the molds opened and then be filled by a closing motion of the molds. A method for filling a molten thermoplastic resin can be optionally selected from the above methods depending, for example, on the desired product configuration.

In any of the above methods, the temperature of a molten thermoplastic resin to be supplied depends on the type of the thermoplastic resin and the optimum temperature is set depending on the resin to be used. For example, in use of a thermoplastic resin material resulting from addition of an olefin rubber to a polypropylene resin, the temperature of the resin is set to approximately from 170 to 260° C., preferably approximately from 190 to 230° C.

Figure 7:
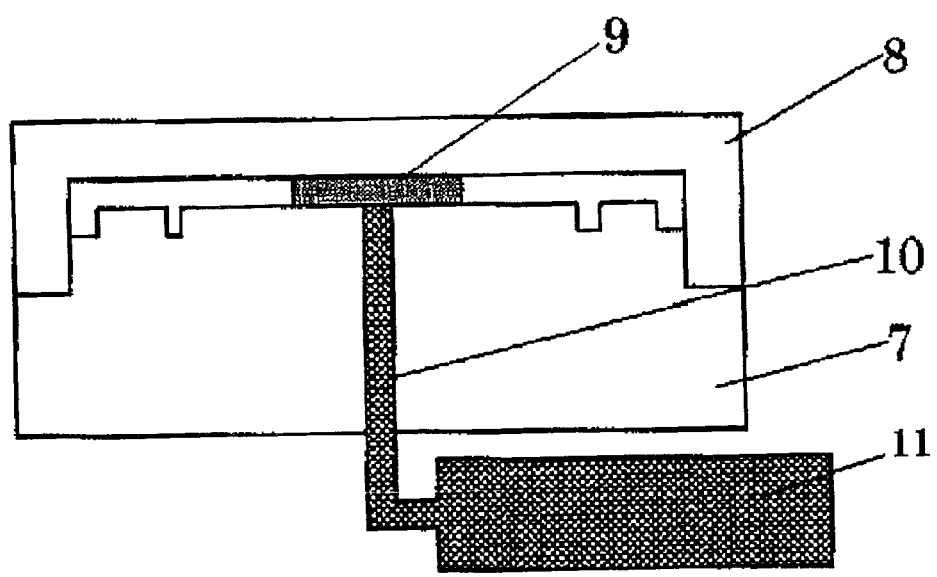
FIG. 7 shows a step in the production of a thermoplastic resin foam molding of the present invention using a schematic sectional view of a mold used.
Figure 8:
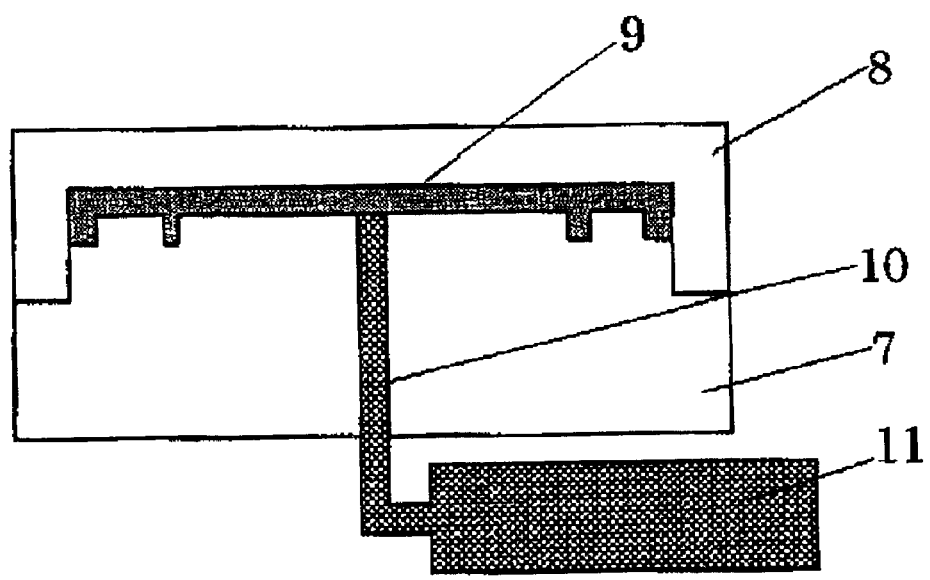
FIG. 8 shows a step in the production of a thermoplastic resin foam molding of the present invention using a schematic sectional view of a mold used.
Figure 9:
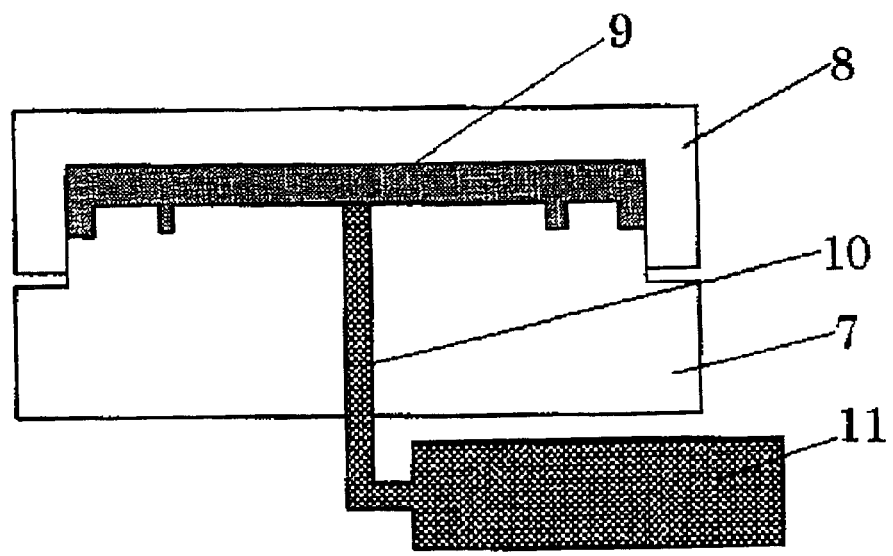
FIG. 9 shows a step in the production of a thermoplastic resin foam molding of the present invention using a schematic sectional view of a mold used.

Examples of methods by the former technique, injection filling, include a method in which supply of a molten thermoplastic resin (9) is started while the molds are positioned so that the cavity clearance is smaller than the thickness of a molding before foaming (FIG. 7), the mold is opened during the supply of the molten thermoplastic resin (FIG. 8), and the molten thermoplastic resin is filled into the cavity so that the cavity clearance becomes equal to the thickness of the molding before foaming at the time of completion of the supply of the molten thermoplastic resin (FIG. 9), and a method in which a molten thermoplastic resin is supplied to the cavity while the molds are positioned so that the cavity clearance is equal to the thickness of a molding before foaming.

In the former case, that is, in the case where the supply of a molten thermoplastic resin (9) is started while the molds are positioned so that the cavity clearance is smaller than the thickness of a molding before foaming, the cavity clearance at the time of start of the resin supply is usually adjusted within the range such that the cavity capacity at that time is not less than 5% by volume and less than 100% by volume, preferably from 30% by volume to 70% by volume, based on the volume of the molding before foaming.

If the supply of the molten thermoplastic resin (9) is started in such conditions, the movable mold is moved back and the cavity clearance is extended with the progress of the supply of the molten thermoplastic resin. When the supply of a predetermined amount of molten thermoplastic resin is completed, the volume of the molten thermoplastic resin supplied becomes approximately equal to the cavity capacity and the cavity is filled with the molten thermoplastic resin.

One can extend the cavity clearance actively using a press device or the like mounted to the mold while controlling the amount of extension of the cavity clearance and, alternatively, can extend it using supply pressure of the molten thermoplastic resin to supply. It is desirable to control the extension of the cavity clearance so that the pressure applied to the resin is approximately from 2 to 50 MPa.

In the course of the cavity clearance extension, the cavity capacity may become greater than the volume of the molten thermoplastic resin (9) supplied, but this does not cause any serious problem because in such a case one can close the mold so as to achieve a predetermined cavity clearance before or almost simultaneously with the completion of supply of the molten thermoplastic resin. It is desirable also in such a case to keep the pressure applied to the resin within the range recited above.

In the latter case, that is, in the case where a molten thermoplastic resin (9) is supplied to fill the cavity while the molds are positioned so that the cavity clearance is equal to the thickness of a molding before foaming, the cavity clearance can be kept equal to the thickness of the molding before foaming during the period of from the start of the molten thermoplastic resin supply to the completion thereof as in the case of usual injection molding.

Figure 12:
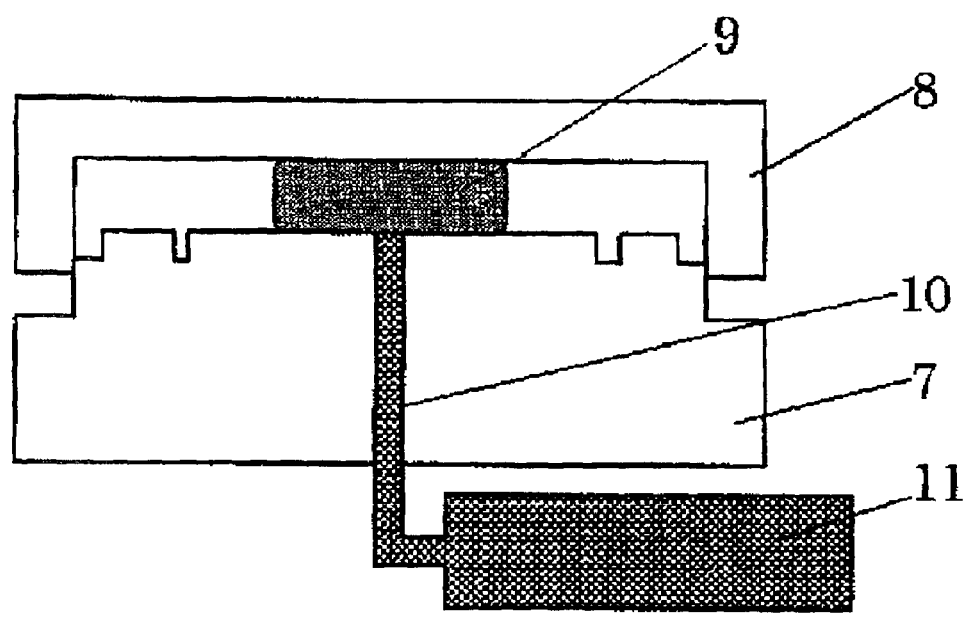
FIG. 12 shows a step in the production of a thermoplastic resin foam molding of the present invention using a schematic sectional view of a mold used.

Examples of methods for filling the cavity with a molten thermoplastic resin by a closing motion of the molds include a method comprising supplying a predetermined amount of molten thermoplastic resin while previously opening the molds so that the cavity clearance is not less than the thickness of a molding before foaming (FIG. 12), and filling the molten thermoplastic resin into the cavity by closing the mold after or simultaneously with the completion of the resin supply so that the cavity clearance becomes equal to the thickness of the molding before foaming, and a method comprising starting to supply a molten thermoplastic resin while previously opening the molds so that the cavity clearance is not less than the thickness of a molding before foaming, starting to close the mold while supplying the molten thermoplastic resin, conducting the supply of the molten thermoplastic resin and the mold closing in parallel, and rendering the cavity clearance equal to the thickness of the molding before foaming almost simultaneously with or after the completion of the molten thermoplastic resin supply.

The mold cavity that has been filled with the molten thermoplastic resin (9) is in a state where almost no vacancies are contained therein.

In this state, a skin layer (3) is formed in the molten thermoplastic resin's surface being in contact with a molding face of the mold. If cooling is conducted while holding that state, the molten thermoplastic resin supplied starts to solidify from its surface portion being in contact with the molding face of the mold and a skin layer (3) containing almost no vacancies is formed soon because the mold temperature is generally set to a temperature lower than the melting or softening point of the thermoplastic resin to be used.

The temperature of the mold can be determined suitably depending on the type of a thermoplastic resin to be used. For example, in use of a thermoplastic resin material resulting from addition of an olefin rubber to a polypropylene resin, the temperature of the mold is set to approximately from 40 to 80° C., preferably approximately from 50 to 70° C.

The cooling time, that is, the time required since the molten thermoplastic resin is filled into the cavity and until the mold is opened in the next step, has a great effect on the formation of a skin layer. If the cooling time is too short, almost no skin layer is formed or an extremely thin skin layer is formed. If the cooling time is too long, a skin layer becomes too thick. Therefore, the cooling time is suitably determined so that a skin material having a desired thickness L is formed.

The cooling time varies depending on, for example, the mold temperature, the temperature of a molten thermoplastic resin and the type of the resin, but usually is approximately from 0.1 to 20 seconds.

Figure 10:
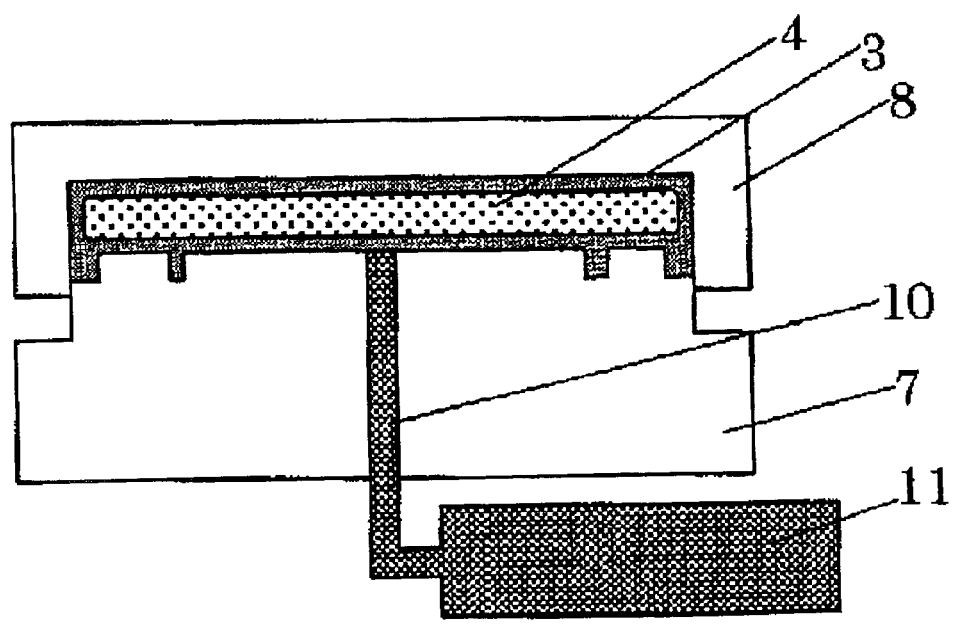
FIG. 10 shows a step in the production of a thermoplastic resin foam molding of the present invention using a schematic sectional view of a mold used.

If the mold cavity is opened in the thickness direction of a molding after the formation of a desired skin layer, the foaming component trapped in an un-solidified portion of the molten thermoplastic resin supplied expands and the resin thickens as a whole in the mold opening direction, that is, in the thickness direction while foaming (FIG. 10).

When the cavity clearance becomes the thickness of a final molding after foaming, the mold opening motion is stopped and the molding is cooled while the cavity clearance is held at that thickness.

Alternatively, one can open the mold so that the cavity clearance temporarily becomes slightly greater than the thickness of a final molding and thereafter close the mold so that the cavity clearance becomes the thickness of the final molding while a part of the foamed layer of the thermoplastic resin is still molten.

In this case, the adhesiveness between a surface of the foam molding and a molding face of the mold can be improved, and therefore the shape of the mold can be reproduced with high accuracy and the cooling efficiency can also be improved.

The mold closing motion can be controlled mechanically. When the molds are opened vertically, the cavity can be reduced by the fall of the upper mold due to its weight.

Further, the adhesiveness between a surface of the foam molding and a molding face of the mold can also be improved when a mold is used in which a vacuum suction port having a minute diameter is formed in at least a cavity face that is to become a designed face and vacuum suction is performed using a suction device linked to the vacuum suction port before the start of supplying the molten thermoplastic resin or after the resin supply to adsorb a skin layer formed onto the cavity face. This permits the shape of the mold to be reproduced with high accuracy and also permits the cooling efficiency to be improved.

Figure 11:
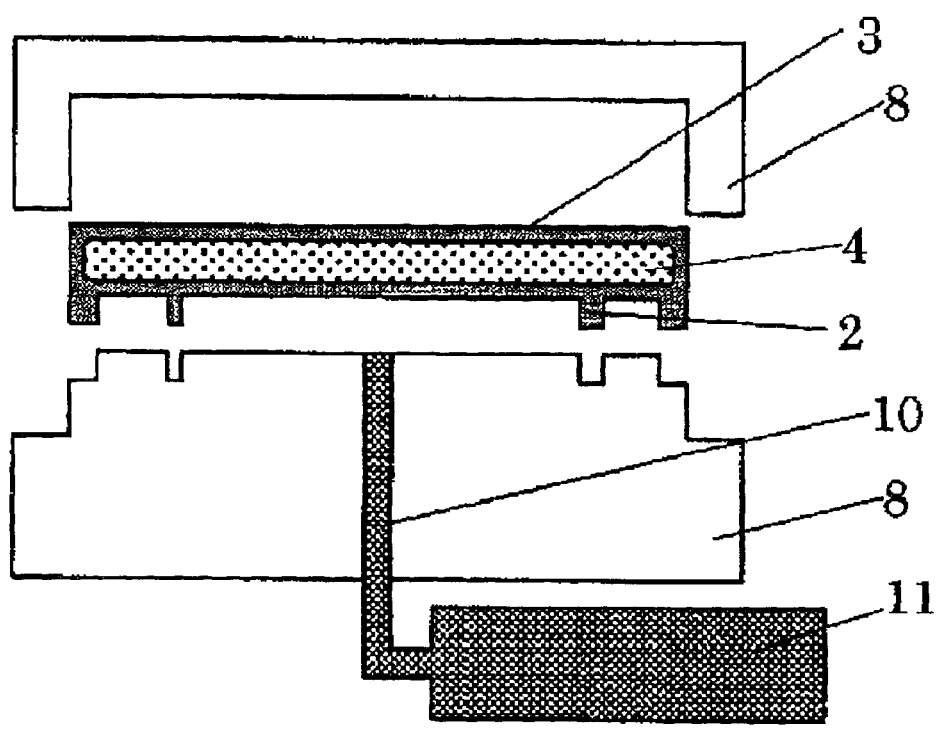
FIG. 11 shows a step in the production of a thermoplastic resin foam molding of the present invention using a schematic sectional view of a mold used.

After the completion of cooling, when completely opening the mold and removing a foam molding, which is a final molding (FIG. 11), one can obtain a thermoplastic resin foam molding that has a dense skin layer (3) in its surface, a foam layer (4) inside the skin layer, and a projection with a predetermined shape formed in one piece as illustrated in FIG. 1.

The following description is directed to an example of a method for producing a thermoplastic resin foam molding having a joint with an foamed ratio of from 1 to 1.3 formed between a projection and a substrate, the foam molding being a preferred embodiment of thermoplastic resin foam moldings of the present invention.

Figure 13:
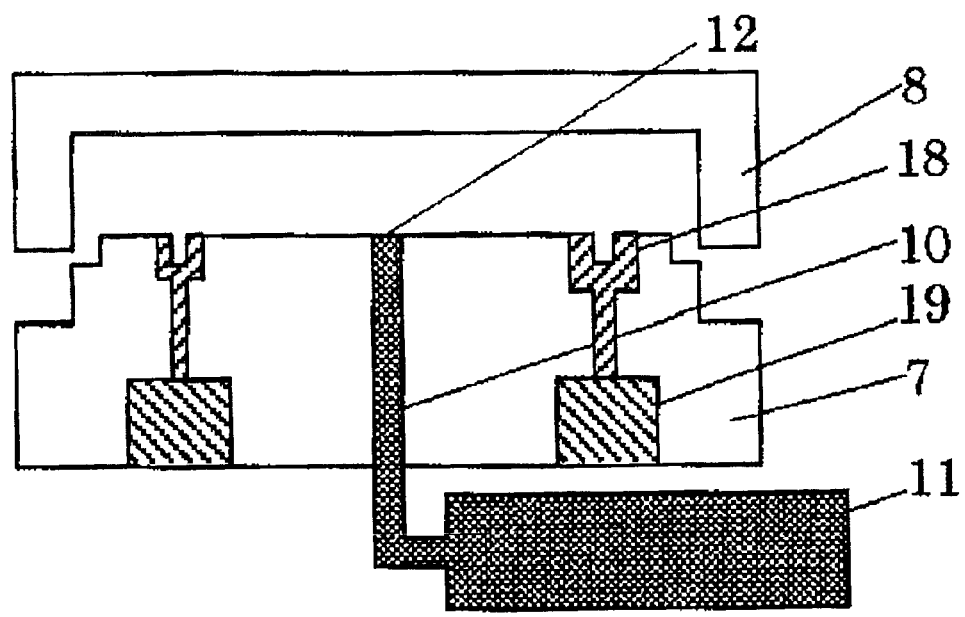
FIG. 13 shows a step in the production of a thermoplastic resin foam molding of the present invention using a schematic sectional view of a mold used.

FIG. 13 shows an example of a mold used for such methods using a schematic sectional view.

This mold comprises a pair of a male mold (7) and a female mold (8). Generally, one of the mold is mounted to a clamping device such as a press device and another is fixed so that the molds can be opened and closed relatively in a vertical or horizontal direction.

In the figure, the male mold (7) is fixed and the female mold (8) is mounted to a press device (not shown) so that the molds are opened and closed relatively in a vertical direction.

Such a mold has, in its predetermined position, a slide core (18) having therein an impression for forming a projection. In the figure, an impression and a slide core (18) are formed in the lower-arranged mold. However, they may be provided in the upper-arranged mold or may be provided in both molds.

A joint between a mold face for forming a substrate and an impression for forming a projection must be designed so that a molding finally obtained has a predetermined curvature R.

The slide core (18) must be able to be moved optionally and controllably in the opening and closing direction of the mold. The moving means used for this purpose may be a cylinder (19) or the like using oil pressure or air pressure or may be means using a spring or the like.

The method for supplying a molten thermoplastic resin (9) into a mold cavity is optional. However, generally preferred is a method wherein a resin supply port (12), which is linked to a resin supply device (11) via a resin supply passage (10) formed in the mold, is arranged in the mold face of one of the molds or in the mold faces of both molds and a molten thermoplastic resin (9) is supplied to the cavity through the resin supply port (12).

In such a preferred case, it is desirable that an optionally controllable opening and closing valve is provided in the resin supply passage (10) near the resin supply port (12) so that the supply and the stop of a molten thermoplastic resin accumulated in the resin supply device (11) such as an injection device can be optionally controlled.

The molten thermoplastic resin (9) can be filled into the mold cavity by injection filling carried out while the molds are closed. Alternatively, the molten thermoplastic resin (9) can be supplied to between the molds opened and then be filled by a closing motion of the molds. A method for filling a molten thermoplastic resin can be optionally selected from the above methods depending, for example, on the desired product configuration.

In any of the above methods, the temperature of a molten thermoplastic resin to be supplied depends on the type of the thermoplastic resin and the optimum temperature is set depending on the resin to be used. For example, in use of a thermoplastic resin resulting from addition of an olefin rubber to a polypropylene resin, the temperature of the resin is set to approximately from 170 to 260° C., preferably approximately from 190 to 230° C.

Figure 14:
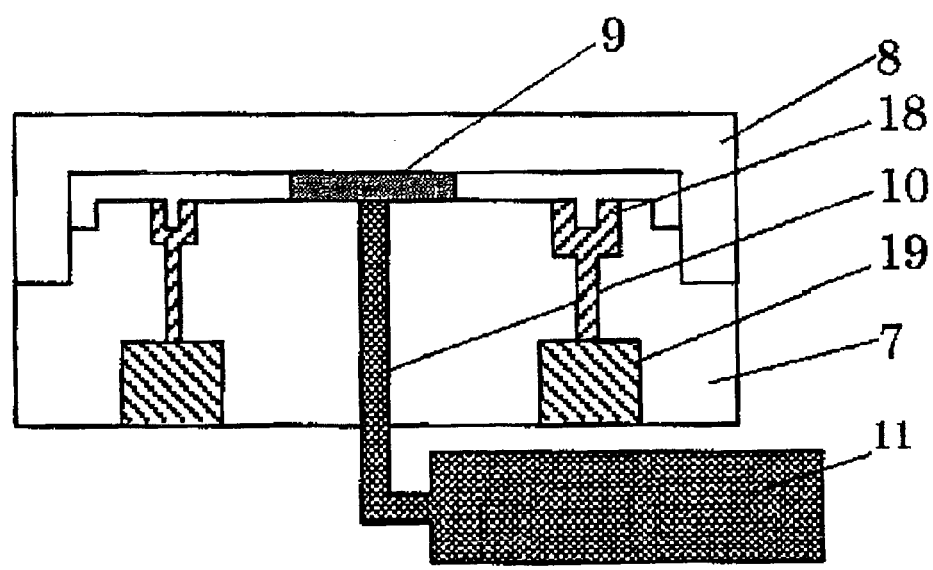
FIG. 14 shows an example of a mold used in a step in the production of a thermoplastic resin foam molding that is another preferred embodiment of the present invention, using a schematic sectional view.
Figure 15:
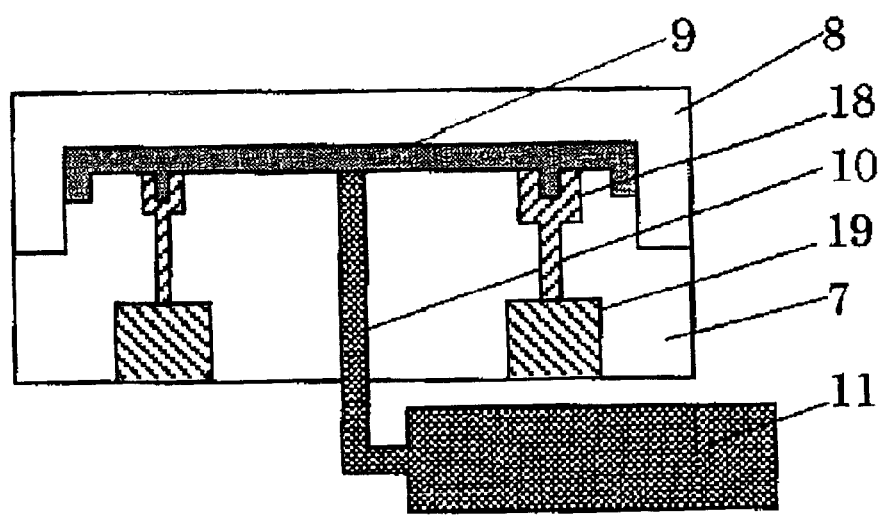
FIG. 15 shows an example of a mold used in a step in the production of a thermoplastic resin foam molding that is still another preferred embodiment of the present invention, using a schematic sectional view.
Figure 16:
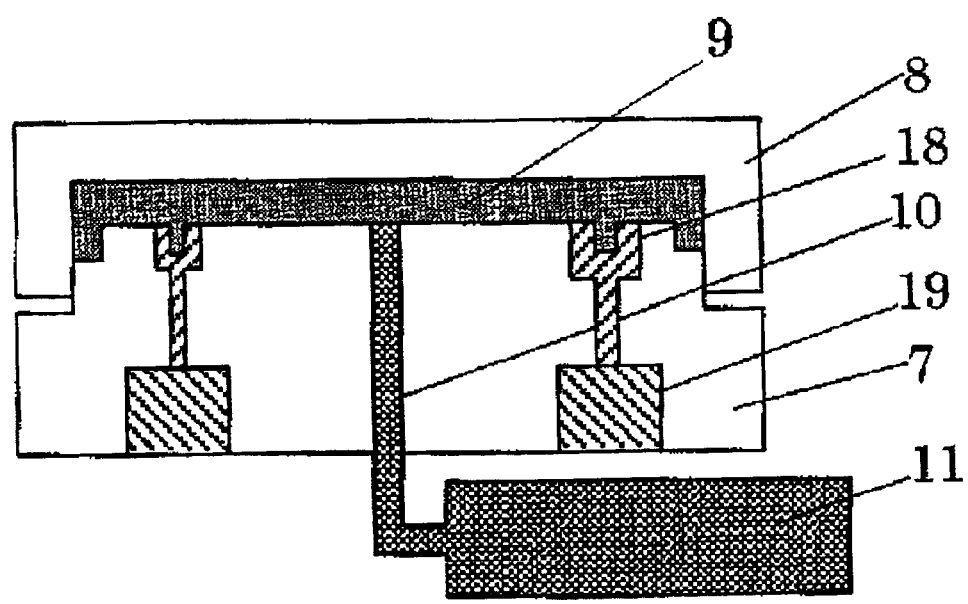
FIG. 16 shows an example of a mold used in a step in the production of a thermoplastic resin foam molding that is still another preferred embodiment of the present invention, using a schematic sectional view.

Examples of methods by the former technique, injection filling, include a method in which supply of a molten thermoplastic resin (9) is started while the molds are positioned so that the cavity clearance is smaller than the thickness of a molding before foaming (FIG. 14), the mold is opened during the supply of the molten thermoplastic resin (FIG. 15), and the molten thermoplastic resin is filled into the cavity so that the cavity clearance becomes equal to the thickness of the molding before foaming at the time of completion of the supply of the molten thermoplastic resin (FIG. 16), and a method in which a molten thermoplastic resin is supplied to the cavity while the molds are positioned so that the cavity clearance is equal to the thickness of a molding before foaming. In the former case, that is, in the case where the supply of a molten thermoplastic resin (9) is started while the molds are positioned so that the cavity clearance is smaller than the thickness of a molding before foaming, the cavity clearance at the time of start of the resin supply is usually adjusted within the range such that the cavity capacity at that time is not less than 5% by volume and less than 100% by volume, preferably from 30% by volume to 70% by volume, based on the volume of the molding before foaming.

If the supply of the molten thermoplastic resin (9) is started in such conditions, the movable mold is moved back and the cavity clearance is extended with the progress of the supply of the molten thermoplastic resin. When the supply of a predetermined amount of molten thermoplastic resin is completed, the volume of the molten thermoplastic resin supplied becomes approximately equal to the cavity capacity and the cavity is filled with the molten thermoplastic resin.

One can extend the cavity clearance actively using a press device or the like mounted to the mold while controlling the amount of extension of the cavity clearance and, alternatively, can extend it using supply pressure of the molten thermoplastic resin to supply. It is desirable to control the extension of the cavity clearance so that the pressure applied to the resin is approximately from 2 to 50 MPa.

In the course of the cavity clearance extension, the cavity capacity may become greater than the volume of the molten thermoplastic resin (9) supplied, but this does not cause any serious problem because in such a case one can close the mold so as to achieve a predetermined cavity clearance before or almost simultaneously with the completion of supply of the molten thermoplastic resin. It is desirable also in such a case to keep the pressure applied to the resin within the range recited above.

In the latter case, that is, in the case where a molten thermoplastic resin (9) is supplied to fill the cavity while the molds are positioned so that the cavity clearance is equal to the thickness of a molding before foaming, the cavity clearance can be kept equal to the thickness of the molding before foaming during the period of from the start of the molten thermoplastic resin supply to the completion thereof as in the case of usual injection molding.

Figure 19:
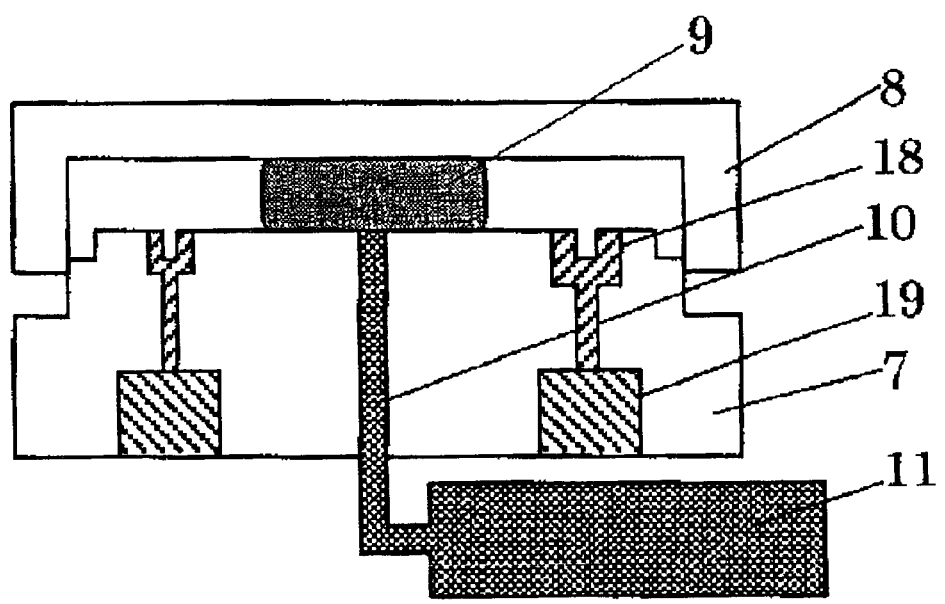
FIG. 19 shows an example of a mold used in a step in the production of a thermoplastic resin foam molding that is still another preferred embodiment of the present invention, using a schematic sectional view.

Examples of methods for filling the cavity with a molten thermoplastic resin by a closing motion of the molds include a method comprising supplying a predetermined amount of molten thermoplastic resin while previously opening the molds so that the cavity clearance is not less than the thickness of a molding before foaming (FIG. 19), and filling the molten thermoplastic resin into the cavity by closing the mold after or simultaneously with the completion of the resin supply so that the cavity clearance becomes equal to the thickness of the molding before foaming, and a method comprising starting to supply a molten thermoplastic resin while previously opening the molds so that the cavity clearance is not less than the thickness of a molding before foaming, starting to close the mold while supplying the molten thermoplastic resin, conducting the supply of the molten thermoplastic resin and the mold closing in parallel, and rendering the cavity clearance equal to the thickness of the molding before foaming almost simultaneously with or after the completion of the molten thermoplastic resin supply.

If a slide core (18) stays at a position projecting from a mold cavity face during the supplying and filling of a molten thermoplastic resin (9) to the mold cavity by such methods, the slide core may come in contact with the cavity face of the facing mold or a molding may become to have a small thickness in its part corresponding to the face of the slide core. Therefore, it is desirable that the face of the slide core is present in a level such that the face is connected levelly with the cavity face surrounding the slide core or in a level recessed to some extent from the surrounding cavity face. In some cases, the slide core (18) may be suitably moved, for example, be moved forward or backward, simultaneously with the filling of a molten thermoplastic resin (9).

The mold cavity that has been filled with the molten thermoplastic resin (9) is in a state where almost no vacancies are contained therein.

In this state, a skin layer (3) is formed in the molten thermoplastic resin's surface being in contact with a molding face of the mold. If cooling is conducted while holding that state, the molten thermoplastic resin supplied starts to solidify from its surface portion being in contact with the molding face of the mold and a skin layer (3) containing almost no vacancies is formed soon because the mold temperature is generally set to a temperature lower than the molting or softening point of the thermoplastic resin to be used.

The temperature of the mold can be determined suitably depending on the type of a thermoplastic resin to be used. For example, in use of a thermoplastic resin material resulting from addition of an olefin rubber to a polypropylene resin, the temperature of the mold is set to approximately from 40 to 80° C., preferably approximately from 50 to 70° C.

The cooling time, that is, the time required since the molten thermoplastic resin is filled into the cavity and until the mold is opened in the next step, has a great effect on the formation of a skin layer. Therefore, the cooling time is suitably determined so that a skin material having a desired thickness is formed.

The cooling time varies depending on, for example, the mold temperature, the temperature of a molten thermoplastic resin and the type of the resin, but usually is approximately from 0.1 to 20 seconds.

Figure 17:
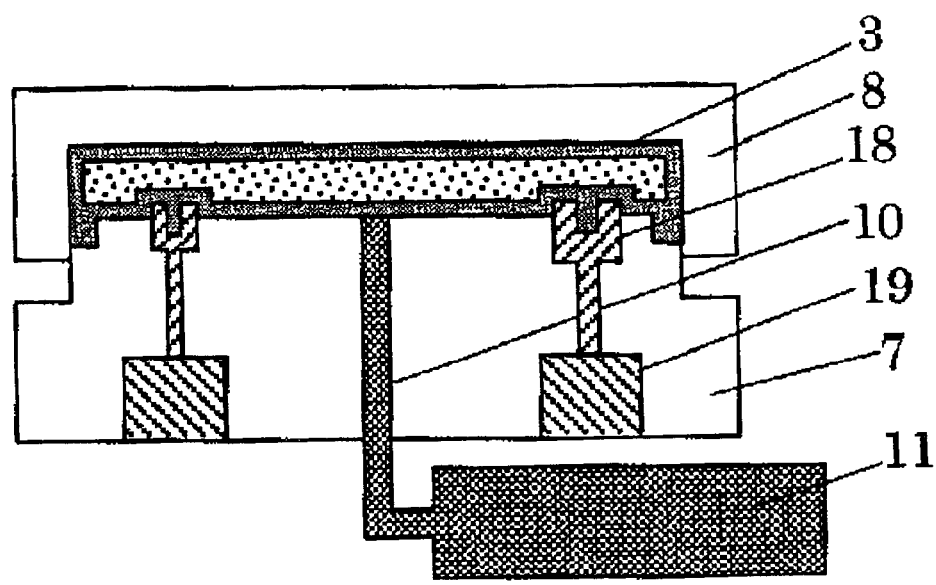
FIG. 17 shows an example of a mold used in a step in the production of a thermoplastic resin foam molding that is still another preferred embodiment of the present invention, using a schematic sectional view.

If the mold cavity is opened in the thickness direction of a molding after the formation of a desired skin layer, the foaming component trapped in an un-solidified portion of the molten thermoplastic resin supplied expands and the resin thickens as a whole in the mold opening direction, that is, in the thickness direction while foaming (FIG. 17).

In the above operation, if the slide core (18) is moved in the mold opening direction by an amount equal to or slightly less than the amount of the opening of the mold that faces the slide core in synchronization with the opening of the mold, a portion little or slightly foamed can be formed in a molding.

When the cavity clearance becomes the thickness of a final molding after foaming, the mold opening motion is stopped and the molding is cooled while the cavity clearance is held at that thickness.

Alternatively, one can open the mold so that the cavity clearance temporarily becomes slightly greater than the thickness of a final molding and thereafter close the mold so that the cavity clearance becomes the thickness of the final molding while a part of the foamed layer of the thermoplastic resin is still molten.

In this case, the adhesiveness between a surface of the foam molding and a molding face of the mold can be improved, and therefore the shape of the mold can be reproduced with high accuracy and the cooling efficiency can also be improved.

The mold closing motion can be controlled mechanically. When the molds are opened vertically, the cavity can be reduced by the fall of the upper mold due to its weight.

Further, the adhesiveness between a surface of the foam molding and a molding face of the mold can also be improved when a mold is used in which a vacuum suction port having a minute diameter is formed in at least a cavity face that is to become a designed face and vacuum suction is performed using a suction device linked to the vacuum suction port before the start of supplying the molten thermoplastic resin or after the resin supply to adsorb a skin layer formed onto the cavity face. This permits the shape of the mold to be reproduced with high accuracy and also permits the cooling efficiency to be improved.

Figure 18:
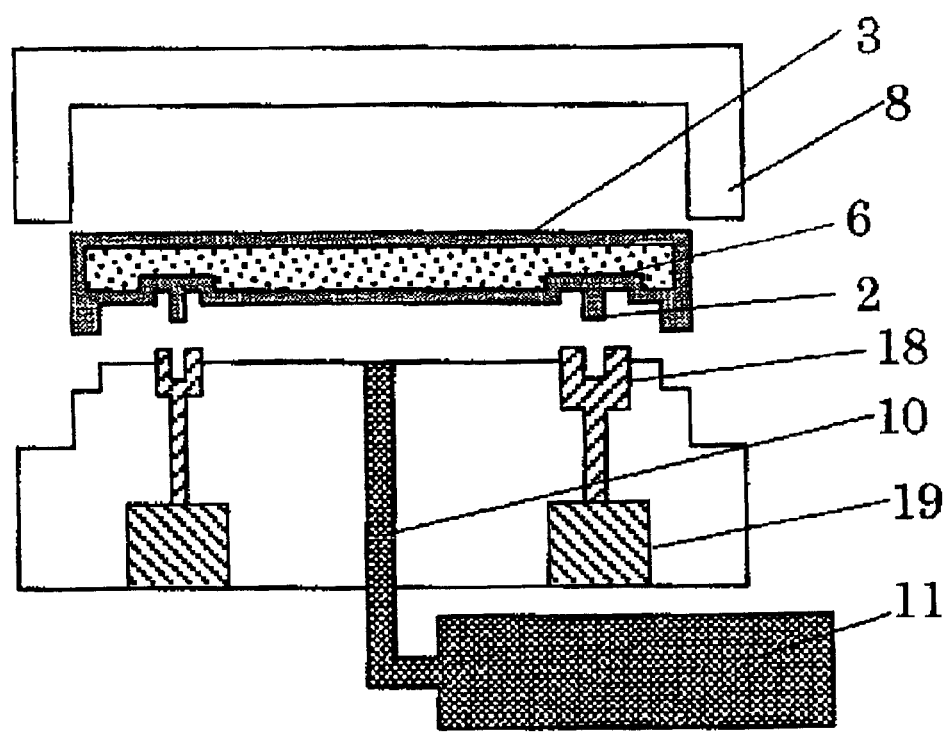
FIG. 18 shows an example of a mold used in a step in the production of a thermoplastic resin foam molding that is still another preferred embodiment of the present invention, using a schematic sectional view.

After the completion of cooling, when completely opening the mold and removing a thermoplastic resin foam molding, which is a final molding (FIG. 18), one can obtain a thermoplastic resin foam molding that has a dense skin layer (3) in its surface, a foam layer (4) inside the skin layer, and a projection formed in one piece as illustrated in FIG. 1.

Figure 20:
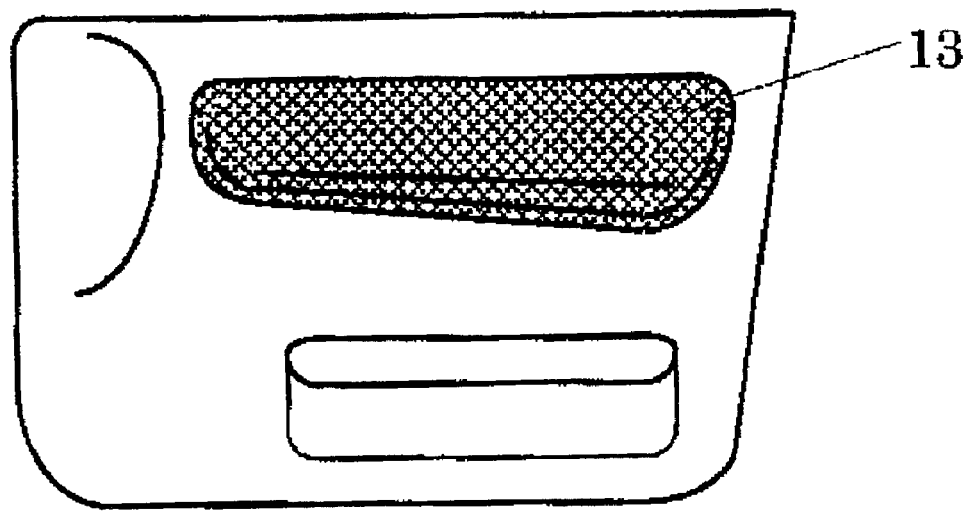
FIG. 20 shows a thermoplastic resin foam molding of the present invention wherein the foam molding is an example of a foamed molding having a skin material laminated thereon.

Further, if supplying a skin material (13) such as a sheet and a film to a predetermined position in a mold and thereafter performing molding in the above-mentioned manners, one can produce a skin material-laminated thermoplastic resin foam molding wherein a skin material such as a film and a sheet is laminated on a part or the whole of the surface of the molding as illustrated in FIG. 20.

In such as method, by adjustment of molding conditions such as the amount of a foaming agent used, the amount of opening of the mold after filling of a molten thermoplastic resin into a mold cavity or the width or length of an impression for forming a projection, a thermoplastic resin foam molding satisfying various requirements defined in the present invention can be easily produced.

A thermoplastic resin foam molding of the present invention can be used widely for automotive interior applications, household electrical appliances, building materials and so on because of its light weight, high rigidity and excellent joint strength between a substrate and a projection such as a rib, boss and bracket. Particularly, it is useful as a thermoplastic resin foam molding for automotive interior applications.

What is claimed is:

1. A thermoplastic resin foam molding comprising a substrate and a projection which is welded at the bottom thereof of the substrate or is formed integrally with the substrate from the same material as that of the substrate wherein the substrate has a foam layer and a skin layer which contains no voids and which is of the same material as that of the foam layer wherein the ratio (R/L) of the curvature R of a joint between the projection and the substrate to the thickness L of the skin layer is from 3 to 50, R is a value defined by the outermost surfaces of the substrate and the projection, and L is an average value of the thickness of the skin layer measured in cross section in the thickness direction in at least three positions near the protection but not where the substrate and projection join.

2. The thermoplastic resin foam molding according to claim 1 wherein the foam layer of the substrate has a density $\rho$ of 0.7 g/cm$^3$ or less.

3. The thermoplastic resin foam molding according to claim 1 wherein a joint between the substrate and the projection has an foamed ratio of from 1 to 1.3 times.

4. The thermoplastic resin foam molding according to claim 3 wherein the projection has an average foamed ratio of from 1 to 1.3 times.

5. The thermoplastic resin foam molding according to claim 1 wherein the thermoplastic resin is a propylene-based resin whose Izod impact value at 23° C. is 10 KJ/m$^2$ or more.

6. The thermoplastic resin foam molding according to claim 1 wherein the thermoplastic resin foam molding is that for automotive interior.

7. The thermoplastic resin foam molding according to claim 1, wherein the projection is formed integrally with the substrate from the same material as that of the substrate.

8. An automotive interior part comprising a thermoplastic resin foam molding, said molding comprising a substrate having a bottom portion, a projection projecting from said bottom portion, said substrate and said projection being formed as one piece during molding from the same material, wherein a joint is defined by the projection relative to said substrate, said substrate including a skin layer having thickness L and a foam layer wherein both are of the same material, said skin layer having no voids, said joint having a curvature R wherein the ratio of R/L is from 3 to 50, R is a value defined by the outermost surfaces of the substrate and the protection, and L is an average value of the thickness of the skin layer measured in cross section in the thickness direction in at least three positions near the projection but not where the substrate and protection join.

* * * * *